Aug. 30, 1938. S. NASO ET AL 2,128,846
PINKING MACHINE
Filed Nov. 23, 1936  5 Sheets-Sheet 1
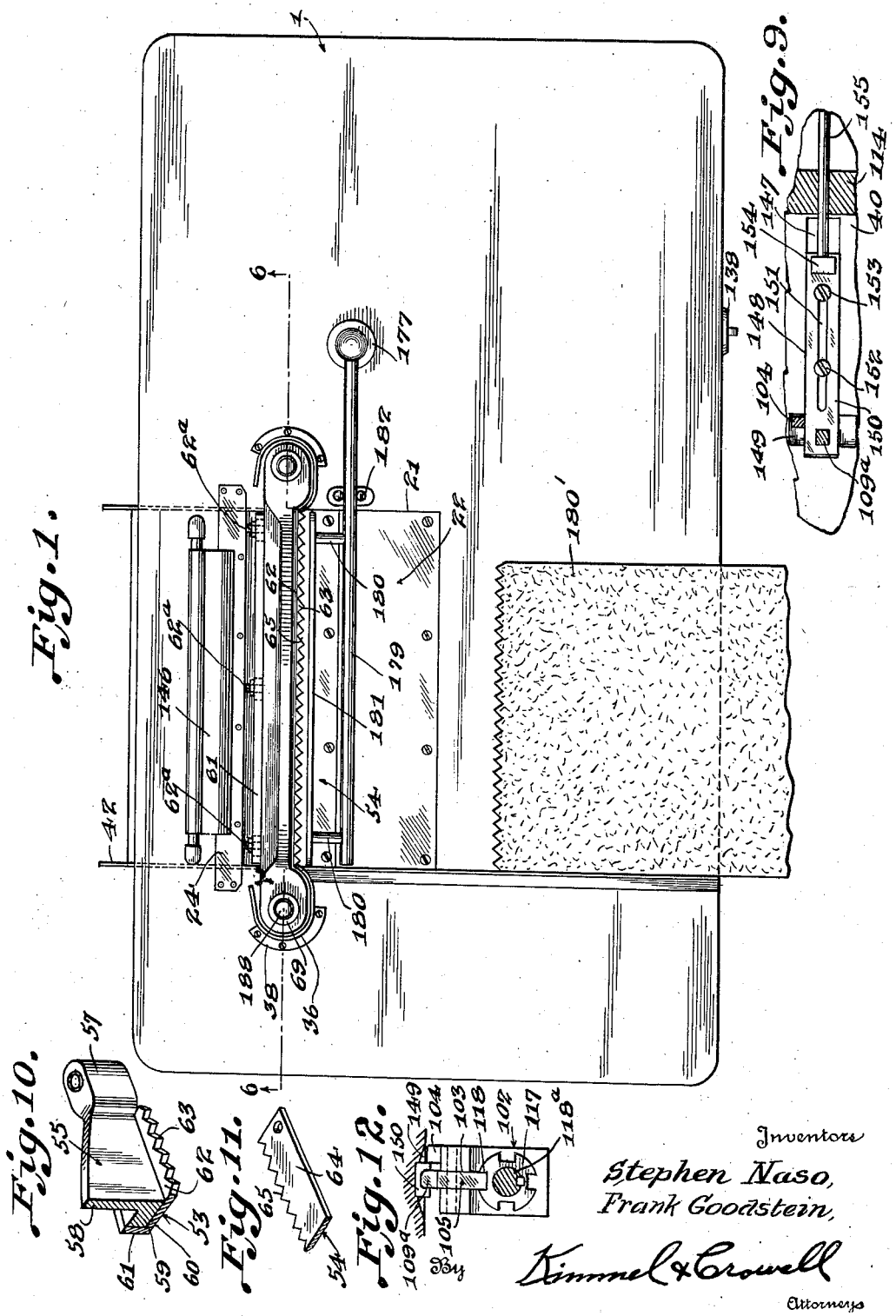

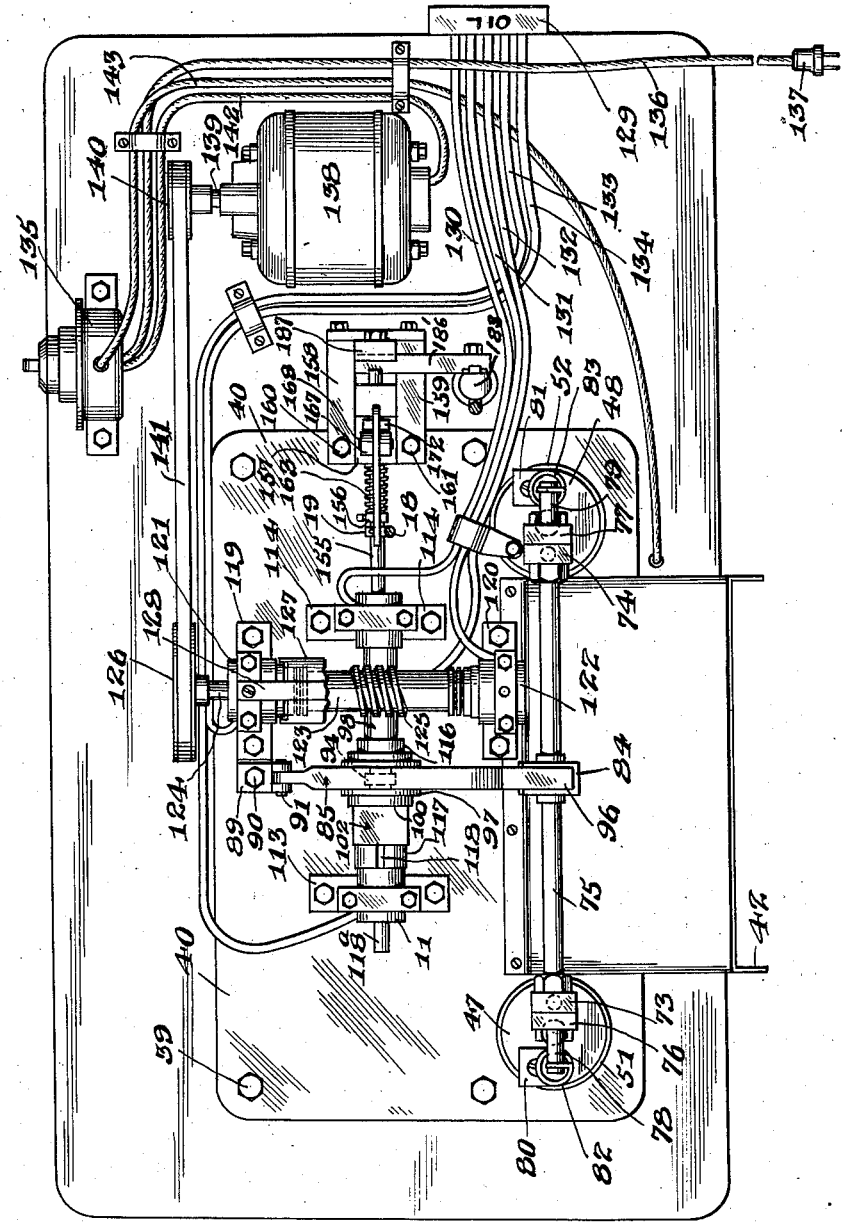

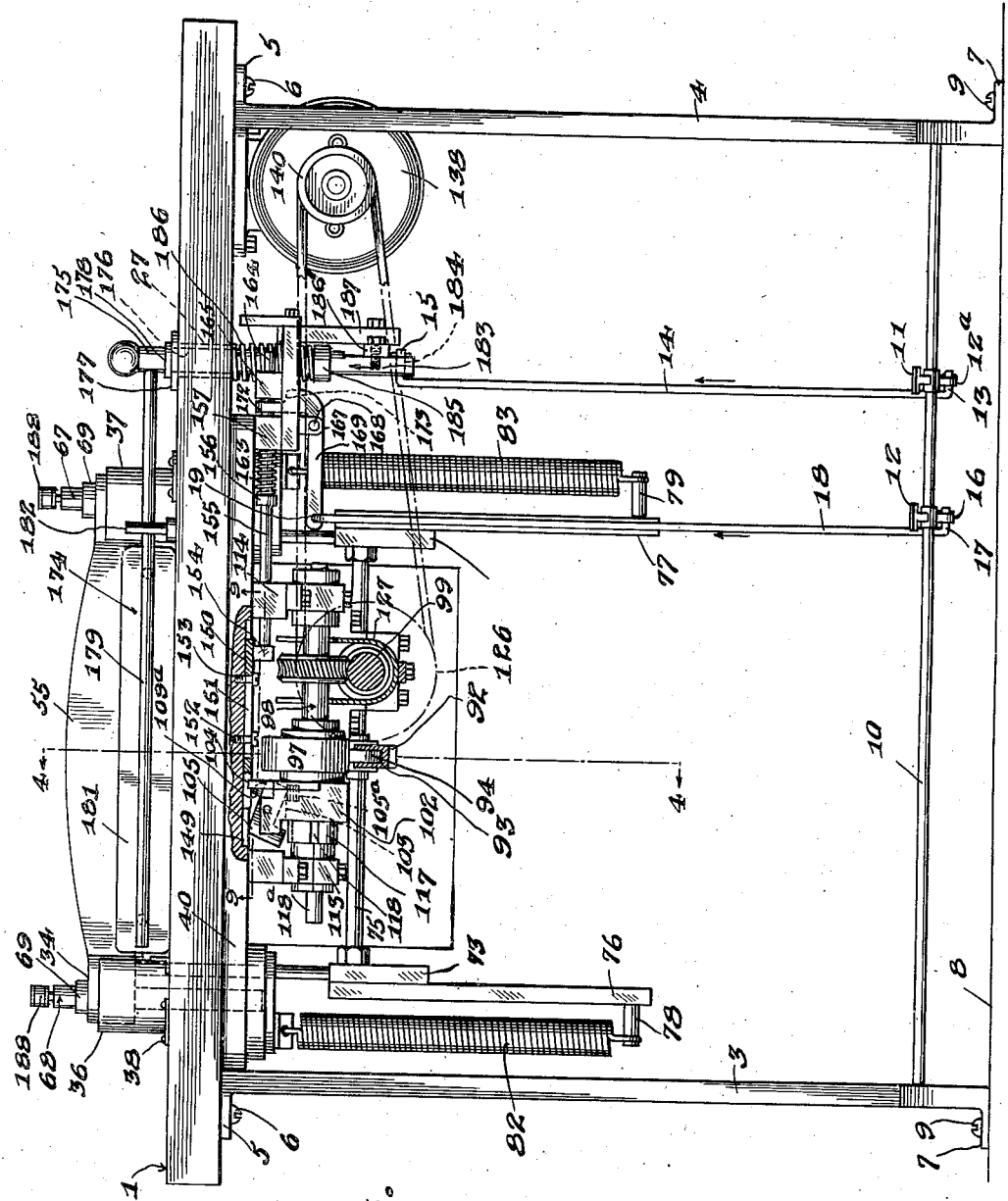

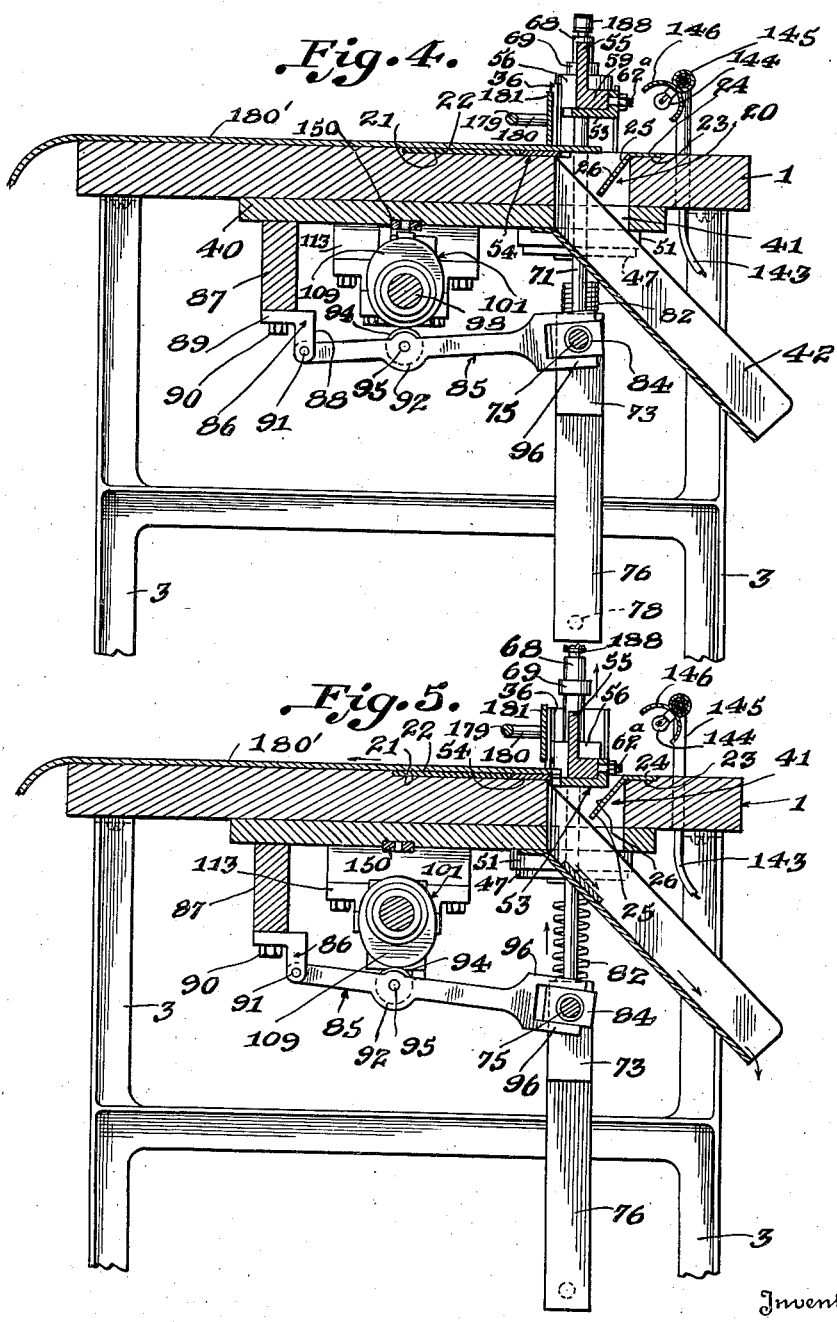

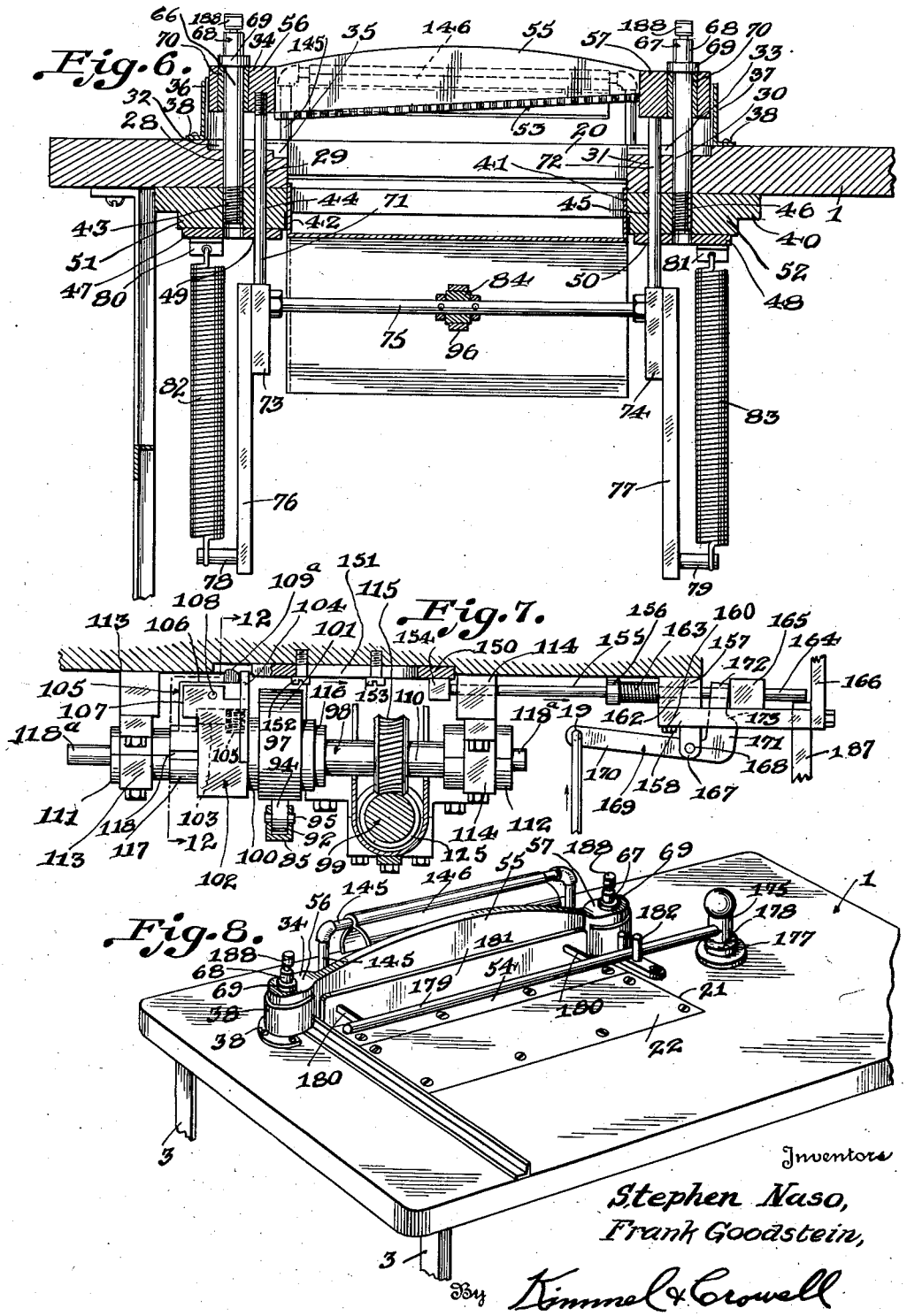

Patented Aug. 30, 1938

2,128,846

UNITED STATES PATENT OFFICE 2,128,846

PINKING MACHINE

Stephen Naso and Frank Goodstein, Easton, Pa.

Application November 23, 1936, Serial No. 112,397

12 Claims. (Cl. 164—50)

This invention relates to a pinking machine designed primarily for use in pinking the bottoms of trouser legs, but it is to be understood that a machine, in accordance with this invention is for use in pinking any material for which it may be found applicable, and the invention has for its object to provide, in a manner as hereinafter set forth, a machine of the class referred to for uniformly serrating, at one operation, the outer end of a trouser leg.

A further object of the invention is to provide, in a manner as hereinafter set forth, a machine of the class referred to under the control of an attendant for uniformly serrating simultaneously a plurality of superposed plys or folds of fabric.

A further object of the invention is to provide, in a manner as hereinafter set forth, a machine of the class referred to having an element of safety to prevent injury to the attendant when positioning the work to be acted upon and during the pinking operation.

A further object of the invention is to provide, in a manner as hereinafter set forth, a machine of the class referred to including a guard means under the control of the attendant, a work-pinking means under the control of the attendant and with the said means being independent of and free of connection to each other and independently controlled by the attendant. There is also a double functional interrelationship (or safety interlock) at times between the safety controls for the prevention of accidents, as indicated in Figs. 3 and 7.

A further object of the invention is to provide, in a manner as hereinafter set forth, a machine of the class referred to including work-cutting means for pinking, having a stationary and a spring controlled shiftable cutter, an oscillatory lever for coaction with said cutting means, an operating mechanism for and free of connection to said lever and including a driven part and a pawl controlled cam structure normally loosely mounted on said driven part, and means under the control of the attendant to provide for the coupling of said driven part and cam structure in unison to cause the movement of said lever in a direction to provide for the cutting means to carry out its function of pinking and with the coupling later uncoupled for a one-revolution clutch effect.

The invention aims to provide, in a manner as hereinafter set forth, a thoroughly efficient pinking machine.

With the foregoing and other objects which may hereinafter appear, the invention consists of the novel construction, combination and arrangement of parts as will be more specifically described and are as illustrated in the accompanying drawings wherein is shown the preferred embodiment of the invention, but it is to be understood that changes, variations and modifications may be resorted to which fall within the scope of the invention as claimed.

In the drawings—

Figure 1 is a top plan view of the machine showing a ply of fabric which has been subjected to the pinking operation carried out by the machine, Figure 2 is an inverted plan view looking towards the lower face of the platform of the machine and with the supporting frame for the platform omitted, Figure 3 is a front elevation of the machine, partly in section and showing the actuating means for the shifting means of the upper cutter in inactive position, Figure 4 is a section on line 4—4, Figure 3 with the cutters or pinkers in inactive position, Figure 5 is a view similar to Figure 4 with the pinkers or cutters shown as having passed through their pinking or cutting operation, Figure 6 is a section on line 6—6, Figure 1, Figure 7 is a fragmentary view in elevation showing the actuating means or mechanism for the shifting means of the upper cutter in active position, Figure 8 is a fragmentary view in perspective, upon a reduced scale, of the top part of the machine, Figure 9 is a section on line 9—9, Figure 3, Figure 10 is a fragmentary view in perspective of part of the upper cutter or pinker, Figure 11 is a fragmentary view in perspective of part of the lower cutter or pinker, and Figure 12 is a section on line 12—12, Figure 7.

The machine includes a rectangular platform 1 of any suitable width, length and thickness and constructed from any suitable material. The platform 1 is supported at its ends upon a pair of spaced, parallel, reinforced, oppositely disposed, like frames 3, 4. Each frame has its body formed of members of angle-shape cross section. The frames have outwardly extending flanges 5 at their upper ends which bear against and are anchored to the lower face of platform 1 by the holdfast means 6. The frames have their lower ends formed with outwardly extending lugs or flanges 7 which are anchored to a floor or other support 8 by the holdfast means 9. Connected to the lower portions of the frames 3, 4 is a supporting shaft 10 having loosely mounted thereon a pair of forwardly extending tread levers 11, 12. The levers 11, 12 are mounted on shaft 10 in a manner to prevent their sliding lengthwise of the shaft. The levers 11, 12 are independent of each other and are rocked independently. The rear portion of lever 11 has a depending extension 12ª in which the angularly disposed lower end 13 of a push bar or rod 14 is loosely mounted. The bar 14 has an upper angularly disposed end 15. The ends 13, 15 are arranged in parallelism. The lever 12 has its rear end formed with a depending extension 16 in which is loosely mounted the angularly disposed lower end 17 of a push bar or rod 18. The end 17 extends in the same plane as the end 13 and in the same direction. The push bar 18 is of greater length than the push bar 14 and has an angularly disposed upper end 19, Figures 2 and 3, which extends at right angles to the direction in which the upper end 15 of the bar 14 extends. The purpose of the push bars 14, 18 will be hereinafter referred to. The push bars 14, 18 are operated independently of each other.

The platform 1 is formed with a rectangular opening 20 between its longitudinal median and its rear edge. The opening 20 is intersected by the transverse median of the platform 1, but it extends a greater distance from one side of such median than from the other side of the latter. The platform 1 in its upper face forwardly with respect to the front wall of opening 20 is mortised as at 21. The width of the mortise is substantially the same as the length of opening 20. The mortise 21 merges at its inner end into the opening 20. Secured within the mortise 21 and flush with the upper face of the platform 1 is a wear plate 22. The length of plate 22 is less than the length of mortise 21. The plate 22 has its forward edge abut against the forward wall of the mortise. The upper face of the platform 1 bordering the rear wall of the opening 20 is mortised as at 23 (Figures 4 and 5) and secured in the mortise 23, as well as being flush with the upper face of platform 1 is the upper part 24 of a deflector 25. The lower part of the deflector 25 is indicated at 26. The part 26 depends into the opening 20 and inclines towards the front wall of opening 20. The part 26 is spaced from the front wall of opening 20. The platform 1 is formed with an opening 27 (Figure 3) and openings 28, 29, 30 and 31, (Figure 6). The openings 28 to 31 both inclusive are arranged rearwardly of the opening 27. The openings 27 to 31 both inclusive are arranged rearwardly of the longitudinal median of the platform. The upper face of the platform 1 bordering the end walls of the openings 20 are formed with oppositely disposed mortises 32, 33 (Figure 6). The bottom of the mortise 32 at the inner end of the latter is formed with a depression 35. The openings 28, 29 communicate with the mortise 32. The openings 30 and 31 communicate with the mortise 33. The mortises 32, 33 communicate with the opening 20. Secured to the upper face of platform 1 and surrounding the mortises 32, 33, with the exception of the inner ends of these latter are oppositely disposed shields 36, 37. The holdfast devices 38 are provided for anchoring the shields to the upper face of the platform 1.

Secured to the lower face of the platform 1 by the holdfast devices 39 is a rectangular plate 40 of materially less width and length than that of the platform 1. The plate 40 has an opening 41 (Figures 4 and 5) which is arranged below and has its walls align with the walls of the opening 20. Secured to the plate 40, extending up through the opening 41 and into the opening 20, bearing against the end walls of the openings 20 and 41 and extending rearwardly at an inclination from the opening 41 is an open top conducting off chute 42 (Figures 4, 5 and 6) for the cuttings. The upper ends of the sides of the chute 42 are arranged below a lower cutter or pinker to be referred to.

The plate 40 is formed with openings 43, 44, 45 and 46 (Figure 6) which register respectively with the openings 28, 29, 31 and 30 formed in the platform 1. The walls of the opening 43, 46 are threaded. Secured with the lower face of the plate 40 are metallic washers 47, 48 having their inner edges registering with the walls of the openings 43, 46. The washers 47, 48 are also formed with openings 49, 50 which register with the openings 44, 45 respectively. The plate 40 has its bottom formed with circular depending portions 51, 52 to which the washers 47, 48 are anchored directly. The openings 43, 44, 45 and 46 extend in the said circular depending portions.

The machine includes a cutting or pinking device which will be hereinafter termed a cutter device. The latter includes an upper horizontally disposed reciprocatory cutter blade 53 (Figures 1, 4, 5, 6 and 10) and a lower stationary horizontally disposed cutter blade 54 (Figures 1, 4, 5 and 11). The blade 53 is arranged against the bottom and the back of a cross head 55 merging at its ends centrally of and into the inner sides of a pair of oval-shaped enlargements 56, 57. The lower face of cross head 55 extends downwardly at an inclination from enlargement 57 to enlargement 56. The cross head 55 is of angle shape cross section (Figure 10) to provide a vertical leg 58 and a horizontal leg 59 which extends rearwardly from the bottom of the leg 58 thereby providing the bottom of the cross head 55 with an enlarged bearing surface for the upper blade 53. The latter consists of a body part which is of angle-shaped contour in cross section thereby providing a horizontal leg 60 and a vertical leg 61 and with the latter extending upwardly from the rear side of the leg 60. The leg 60 in cross section is of materially greater length than the length in cross section of the leg 59 of the cross head 55. The leg 60 abuts against the lower face of the cross head 55 and extends forwardly therefrom as at 62. The leg 61 abuts against the rear edge of the leg 59. The leg 61 functions to provide for the leg 60 extending the required distance from the front of the cross head 55. The blade 53 is bodily carried by the cross head. The leg 61 of the blade 53 is connected, as at 62ª to cross head 55 in a manner to provide for the horizontal adjustment of the blade along both of the two perpendicular axes of the horizontal plane of part 60 of blade 53 (Figure 10). The forward edge of the blade 53 is provided from end to end with cutting teeth 63 to function in connection with the blade 54 to provide a pinking action. The blade extends downwardly at an inclination from the enlargement 57 to enlargement 56 and at the same inclination as that of the bottom edge of the cross head, whereby blade 53 will provide a progressive shearing action when it functions with blade 54 to perform the pinking operation. The blade 54 (Figures 1 and 11) consists of a flat rectangular body 64 which is seated within the mortise 21 and abuts against the wear plate 22. The rear edge of the blade 54 is formed with cutting teeth 65 which coact with the teeth 63 to perform the pinking action. The blade 54 extends into the openings 20 and has its gullets align with the teeth of the blade 53. When the operation of pinking is being performed by the blades 53, 54, the blade 53 extends into the upper end of opening 20 and has its teeth pass through the gullets of the blade 54. The depression 35 provides a clearance for one end of the blade 53 when the latter is lowered into the opening 20. The mortises 32, 33 provide clearances for the enlargements 56, 57 to permit of the teeth of the blade 53 passing through the gullets of the blade 54. The cross head 55 and enlargements 56, 57 provide what may be termed a reciprocatory carrier for the blade 53.

There is associated with the blade carrier a pair of vertically disposed combined guide and stop elements 66, 67 of like form and each of which consists of a rod 68 of circular cross section provided near its upper end with an annular boss 69. The rods 68 extend down through a pair of bearing sleeves 70 which are anchored in the enlargements 56, 57. The rods 68 also extend down through the mortises 32, 33, the openings 28, 30 and threadedly engage with the walls of the openings 43, 46. The blade carrier is slidably mounted on the rods 68. The blade carrier is spring controlled and it is shifted in a downward direction against the action of its controlling springs to be referred to. The bosses 69 are arranged in the path of the enlargements 56, 57 for limiting the upward movement of the blade carrier. Fixedly secured to and depending from the enlargements 56, 57 are vertically disposed rods 71, 72 respectively. The rod 71 passes down through openings 29, 44 and 49. The rod 72 passes down through openings 31, 45 and 50. The rods depend below the washers 47, 48. The lower ends of the rods 71, 72 are secured to a pair of depending supports 73, 74 which are connected together by a shaft 75. Depending from the supports 73, 74 are hangers 76, 77 respectively formed at their lower ends with oppositely extending laterally disposed studs 78, 79 respectively. Depending from the washers 47, 48 are coupling pieces 80, 81 respectively. Anchored at their upper ends to the coupling pieces 80, 81 are the controlling springs 82, 83 respectively for the blade carrier. The lower ends of the springs 82, 83 are secured to the studs 78, 79 respectively. The downward movement of the blade carrier is had against the action of the springs 82, 83, whereby these latter will be extended and when pressure is relieved on the springs 82, 83 the blade carrier will be returned to its normal position such as shown in Figures 4 and 6.

The machine includes an actuatable device for lowering the upper cutter blade 53 to coact with the lower blade 54 to perform the pinking operation. The lowering of blade 53 is had against the action of the springs 82, 83. The said device consists of a pivoted rectangular block 84 (Figures 4, 5 and 6) confined on shaft 75 centrally of the latter, an oscillatory lever 85 disposed in transverse relation with respect to and arranged below plate 40, an angle-shaped bracket 86 and a vertical hanger 87. The latter is anchored with and depends from the rear of plate 40. The bracket 86 consists of a vertical leg 88 and a horizontal leg 89 extending rearwardly from the upper end of leg 88. The leg 89 abuts and is anchored to the lower end of hanger 87 by the hold-fast means 90. The rear end of lever 85 is pivotally connected to the lower end of leg 88 as at 91. The lever 85 rearwardly of its vertical median is formed with an enlargement 92 provided with a pocket 93 (Figure 3) opening at the top edge of the lever. Positioned within and projecting from the pocket 93 is a roller 94 revolubly mounted on a shaft 95 secured to the side walls of the pocket. The forward end terminal portion of lever 85 is in the form of a yoke 96 in which is arranged the block 84. The latter is slidable relative to yoke 96 and has its top and bottom bear against the inner faces of the arms of the yoke. The lever 85 is adapted to be lowered, against the action of the springs 82, 83 by the high part of a cam, forming an element of a rotatable cam structure 97 to be referred to, contacting with the edge of the roller 94 whereby the coaction of yoke 96, block 84 and shaft 75 will lower cross head 55 to an extent to enable the cutter blades to perform the pinking operation. When the high part of the cam clears the roller 94, the springs 82, 83 will restore the cross head 55 and lever 85 to the position shown in Figure 4. The cam of the said rotatable structure is permanently in engagement with the edge of roller 94.

The rotatable cam structure 97 referred to is normally inactive and is adapted to be clutched to a driven operating mechanism 98 therefor, to be referred to. The said mechanism 98 is permanently driven from a driving means 99 therefor, to be referred to.

The cam structure 97 (Figure 7) includes an integral unit having a bore from end to end thereof to provide for the loose mounting of the unit on a portion of the mechanism 98. The unit consists of a sleeve 100, a cam 101 integral with sleeve 100 intermediate the ends of the latter and a clutching member or pawl carrier 102 integral with the outer end of sleeve 100. The carrier 102 is of block-like form and is provided in its top with an angle-shaped groove 103 (Figures 3, 7 and 12) which extends from the outer side to the inner side of the block. The carrier 102 has extending from its inner side an arm 104. Positioned in the groove 103 is a spring controlled clutching member or pawl 105 of angle-shaped contour formed with a horizontal leg 106 and a vertical leg 107 depending from the outer end of the leg 106. The latter, intermediate its ends, is loosely and eccentrically thereof mounted on a pin 108 extending across groove 103. The leg 106 of the clutching member 105 is of greater length than the leg 107. The high part of cam 101 is indicated at 109 (Figures 4 and 5). The rear end of leg 106, on the top edge of the latter, is formed with an upstanding lug 109[a].

The driven operating mechanism 98 (Figure 7) for the rotatable cam structure includes a driven shaft 110 mounted in and extended from spaced bearings 111, 112 respectively supported in spaced parallel hangers 113, 114 depending from and anchored to plate 40, a worm gear 115, a stop collar 116, and a combined stop and clutching collar 117. The gear 115 and collars 116 and 117 are keyed upon shaft 110. The collars 116 and 117 are arranged in parallel spaced relation. The collar 117 has its outer edge formed with spaced transverse grooves 118. The integral unit of the cam structure 97 consisting of the sleeve 100, cam 101 and carrier 102 is loosely mounted on shaft 110 and confined between the collars 116, 117. The shaft 110 has reduced end terminal portions 118[a]. The cam structure 97 is adapted to be connected to the shaft 110 by the engaging of the leg 106 of the spring controlled clutch member 105 in a groove 118 in collar 117. The controlling spring 105a of member 105 permanently acts to maintain the leg 106 of member 105 into clutching engagement with collar 117 as shown in Figure 7. The means for intermittently shifting member 105 from clutching position will be hereinafter referred to.

The driving means 99 for the mechanism 98 (Figure 2) includes a pair of spaced parallel hangers 119, 120 which are anchored to and depend from the plate 40, bearings 121, 122 mounted respectively in the hangers 119, 120, a motor driven shaft 123 mounted on the bearings 121, 122 and having a reduced end terminal portion 124 extending from bearing 121, a worm gear 125 on shaft 123 and a driven pulley 126 on the said end terminal portion 124. The shaft 123 is disposed at right angles to shaft 110. The worm 125 on shaft 123 permanently meshes with the gear 115 on shaft 110.

An open top U-shaped lubricant receiving receptacle 127 is arranged between and is connected to the hangers 119, 120. The shaft 123 is arranged in the lower portion of receptacle 127. The ends of receptacle 127 are closed by the hangers 119, 120 and attached to these latter is a brace bar 128 for the bottom of receptacle 127. The shaft 110 is arranged over shaft 123 and extends through the sides of receptacle 127. The shaft 123 operates in oil.

A lubricant or oil supply container is indicated at 129 (Figure 2) and has extending therefrom lubricant conducting lines 130, 131, 132, 133 and 134, which open into the bearing 112, bearing 122, receptacle 127, bearing 121 and bearing 111 respectively. The container 129 is secured against an end edge of platform 1.

Secured to the lower face of platform 1 is an electrical controlling switch 135 (Figure 2) to which is connected a lead 136 from a power line terminal not shown. The lead 136 has a plug 137 for detachable connection with such line terminal. Suspended from the lower face of platform 1 is an electric motor 138 having its shaft 139 provided with a pulley 140 of less diameter than the pulley 126. The latter is driven from the pulley 140 by an endless belt 141. Leading from the switch 135 to the motor 138 is a motor driving circuit 142. Leading from the switch 135 is a lighting circuit 143 for an electrical lamp or lamps 144 (Figures 4, 5 and 8) arranged rearwardly of cross head 55. The lamp or lamps 144 are suspended by a tubular support 145 into which the circuit 143 extends. A reflector 146 is associated with the lamp or lamps and suspended from support 145. The circuit 143 extends through platform 1.

The lower face of plate 40 has formed therein a lengthwise extending recess 147 (Figure 9) having the part 148 thereof of rectangular cross section and its remaining part 149 of substantially arcuate cross section (Figure 12). The part 148 is of greater length than part 149. The recess 147 is arranged above and aligns with the structure 97 and mechanism 98.

The means for intermittently removing the clutch member or pawl 105 to non-clutching position for the purpose of discontinuing the operation of the cam structure 97 by its driven operating mechanism 98 consists of a rectangular plate 150 (Figures 3, 7 and 9) slidably suspended in the recess 147. The plate 150 is formed with an elongated slot 151 extending lengthwise thereof. Depending from the plate 40 is a pair of fixed spaced headed suspension members 152, 153 upon which plate 150 slides. The plate 150 has depending from one end thereof a lug 154 connected to the inner end of a pull bar or rod 155 which slidably extends through and outwardly from the upper portion of hanger 114. The bar 155 intermediate its ends has fixed thereto a collar 156. Arranged below and positioned against the lower face at one end of the plate 40 (Figures 2, 3 and 7) is a short bar 157 disposed in transverse relation relative to plate 40. Positioned against the lower face of the bar 157, at the ends of the latter are the inner ends or spaced parallel bars 158, 159. The bars 157, 158, 159 are fixedly secured to the plate 40 by the holdfast devices 160, 161. The bar 157 is formed with an opening 162 for the passage of the bar 155. Encompassing the bar 155 between the collar 156 and the bar 157 is a compression spring 163. The opening 162 is disposed centrally of bar 157 and the bar 155 extends outward from said bar. The bar 155 inwardly adjacent its outer end terminal portion 164 has fixed thereto a head 165 arranged in spaced relation with respect to bar 157. The head 165 is slidably mounted on the bars 158, 159. The outer ends of the bars 158, 159 are connected together by an upstanding cross piece 166 adapted to be secured to the lower face of the platform 1 or not so secured. The bar 157 has depending therefrom a pair of spaced apertured lugs 167 which extend downwardly through the space between the bars 158, 159. The spring 163 acts on the bar 155 to shift it to the position shown in Figure 3 for the purpose of bearing on the lug 109a for shifting the clutch member or pawl 105 to the position shown in Figure 3 whereby the operation of the cam structure 97 from the mechanism 98 will be discontinued. When the plate 150 moves clear of the lug 109a the member or pawl 105 will move to clutching position due to the action of its spring 105a.

The plate 150 is moved to a position to clear lug 109a, against the action of the spring 163 by a pulling structure which includes the push rod 18 and the foot lever or tread 12 and the other elements of such pulling structure will now be referred to.

Mounted in the lugs 167 is a pivot 168 and loosely mounted on such pivot is a push lever 169 formed of a pair of legs 170, 171 disposed at right angles to each other. The lever 169 is horizontally disposed. The leg 171 of lever 169 extends upwardly from the outer end of the leg 170. The latter is mounted on the pivot 168. The leg 170 is of greater length than the leg 171. The leg 171 is formed at its upper end with a slot 172 for the bar 155. The leg 171 extends upwardly through the space between the bars 158, 159. The upper end of leg 171 is reduced and is arranged between the bar 157 and the head 165 on bar 155. The normal position of the bar 155 is as shown in Figure 7. The inner end of leg 170 is apertured and loosely connected to the upper end 19 of the push rod 18. In the position shown in Figure 7, the spring 163 has been compressed. In Figure 3, the spring is shown as expanded. When the front of tread lever 12 is forced downwardly, the push bar 18 is moved upwardly which in turn carries the leg 170 of lever 169 upwardly therewith whereby the leg 171 of lever 169 will engage head 165 of bar 155 and move said bar outwardly from the position shown in Figure 3 to the position shown in Figure 7. When the bar 155 is moved outwardly, the plate 150 is carried therewith and moved clear of the lug 109a, whereby the member 105 will be moved by its controlling spring to clutching position relative to the collar 117 and the structure 97 will be clutched to the mechanism 98.

For the purpose of normally maintaining lever 169 in the position as shown in Figure 3, that is to say, with the leg 171 of such lever vertically disposed, the said leg is shouldered, as at 173 and is adapted to abut the head 165.

The machine includes a spring controlled vertically movable guard structure 174 which also functions in a manner as a presser foot relative to the material being acted upon. The structure 174 includes the push rod 14 and the latter constitutes a means for shifting the structure 174 against the action of its controlling spring. The structure 174 includes a vertically movable post 175 which operates through a sleeve 176 secured in opening 27. The sleeve 176 is formed with a flange 177 suitably secured to the upper face of the platform 1. The post 175 carries a stop collar 178 capable of engaging the flange 177 on the downward movement of the post 175. The post 175 is arranged forwardly of and in lateral relation with respect to sleeve 37. Formed integral with the post 175 and extending at right angles thereto and across the plate 22 is a bar 179 having spaced rearwardly extending couplers 180 which are anchored to the front face of a rectangular guard 181 disposed on its lower lengthwise edge, arranged over the cutter 54 and functioning to prevent an attendant's hand being positioned at a point to be injured during the pinking operation. The guard 181 also functions as a presser foot as when it is in active position it bears on the material 180' to be operated upon and in this connection attention is directed to Figures 4 and 5. The bar 179 and guard 181 are bodily movable with the post 175. To prevent the outward swinging of the bar 179 relative to the cross head 55 a stop 182 is arranged outwardly of and intermediate of the ends of the bar 179.

The post 175 is arranged sidewardly of the bar 179 and is formed with a reduced lower portion 183 formed at its lower end with an opening 184 (Figure 3) for the passage of the upper end 15 of the push bar 14. Post 175 carries a fixed collar 185. Mounted on post 175 and interposed between the platform 1 and the collar 185 is a coiled controlling spring 186 for the structure 174. Fixedly secured to the reduced portion 183 of post 175, above the lower end of such portion is the end of a carrier 186' (Figures 2 and 3) which is disposed in transverse relation with respect to platform 1. The carrier extends from the post 175 to below the space between the bars 158, 159 and has fixed to its inner end a vertically disposed stop 187 which operates in the space formed between the bars 158, 159 and forms when raised a stop for arresting the accidental shifting of the plate 150 to release the member 105 when the plate is in the position shown in Figure 3. The stop 187, when mechanism 174 is moved upwardly, is arranged in the path of the rear end of the bar 155 to arrest the outward movement of the latter thereby preventing the shifting of plate 150 to clear the lug 109a and by such arrangement safety member 105 will not be shifted to clutching position by its spring 105a. This provides a safety arrangement to prevent any possibility of the attendant being injured, when positioning the material to be acted upon, when the structure 174 is elevated.

In Fig. 7 the stop 187 is in position to block the raising of the safety guard 174 while the clutch is "in". In other words the stop 187 blocks by its top end (see Fig. 7) a raising of the safety guard 174 when the clutch is "in", and by its side prevents the throwing of the clutch when the guard 174 is up.

On depressing the outer end of the lever 11, the push rod 14 will elevate the structure 184 against the action of its controlling spring 186 and at the same time shift the stop 187 upwardly to oppose the outer end of the bar 155. When the structure 184 is in its lowered position, the outer end of bar or rod 155 clears the upper end of stop 187. The structure 184 is moved to guard position by its controlling spring when lever 11 is relieved of pressure.

The upper ends of the combined guide and stop elements 66, 67 carry lubricant cups 188. The shields 36, 37 are provided for the enlargements 56, 57.

When lever or foot tread 11 is depressed to raise the push rod 14 and structure 174, it also raises the stop 187 which prevents the rod or bar 155 from moving far enough to the right to permit the engagement of the clutch if lever or foot tread 12 is depressed.

When lever or foot tread 12 is depressed, the rod or bar 18 moves upwardly through its connection with the rod or bar 155, the latter and the plate 150 are moved to the right and at the same time compress the spring 163. When the plate 150 is moved to the right it allows the member or pawl 105 to enter a groove 118 in the collar 117, which is due to the action of the spring 105a. As the collar 117 is continuously in motion it provides when the structure 97 is clutched thereto to cause such structure to bodily rotate therewith and the result is that the cam 101 will coact with the lever 85 to cause the lowering of the upper cutter 53. The upper cutter 53 then coacts with the lower cutter 54 to provide the pinking operation. On the revolving of the structure 97 the member 105 and the arm 104 move out of the way or rather clear of the plate 150 and allow the plate 150, due to the action of the spring 163, to move into the position as shown in Figure 3, as the pressure at this time has been released on the lever 12. The pressure on lever 12 is to the extent that the drive shaft will start. After a complete rotation of the structure 97 the lug 109a abuts plate 150 which disengages the structure 97 from the collar 117 and at the same time the arm 104 engages plate 150 to arrest movement of the structure 97. Thus the machine completes the cycle and the reciprocation of the upper cutter is automatically stopped until the lever 12 is again depressed.

What we claim is:

1. In a pinking machine, a cutter means including a stationary lower cutter and a reciprocatory spring controlled upper cutter structure, a normally inactive shiftable lever coacting, when shifted with said structure, for imparting a cutting stroke to said means, a revoluble normally inactive cam structure, providing when active for shifting said lever, a revoluble drive mechanism upon which the cam structure is loosely mounted, said cam structure and mechanism having controllable coacting means for clutching the cam structure and mechanism together to provide for the revolving of the cam structure with said mechanism, a spring controlled shiftable element for controlling and normally acting to retain said coacting means from clutching said cam structure and mechanism together, pressure operated means for shifting said element against the action of its controlling spring from retaining position relative to said coacting means whereby the latter will clutch the cam structure and mechanism together, and a pressure operated spring controlled vertically movable normally lowered combined guard, presser foot and stop mechanism, normally acting for holding down the work to be operated upon over the lower cutter and in the path of the upper cutter and providing when elevated to release the work, acting to arrest the shifting of said element from retaining position relative to the said coacting means.

2. In a pinking machine, a supporting structure including a platform formed with an opening, a cutter means including a lower cutter carried by said platform and extending into said opening and a reciprocatory spring controlled structure extending through the platform and formed with an upper cutter for extension into said opening to coact with the lower cutter, a normally inactive shiftable lever below and supported from said platform, bearing on said structure and provided when shifted for imparting a cutting stroke to said cutter means, a revoluble normally inactive cam structure supported from and below the platform and providing when active for shifting said lever, a revoluble drive mechanism upon which the cam structure is mounted, said cam structure and mechanism having controllable coacting means for clutching the cam structure and mechanism together to provide for the revolving of the cam structure with said mechanism, a spring controlled shiftable element for controlling and normally acting to retain said coacting means from clutching said cam structure and mechanism together, pressure operated means for shifting said element against the action of its controlling spring from retaining position relative to said coacting means whereby the latter will clutch the cam structure and mechanism together, and a pressure operated spring controlled vertically movable normally lowered combined guard, presser foot and stop mechanism normally acting for holding down the work to be operated upon over the lower cutter and in the path of the upper cutter and provided when elevated to release the work acting to arrest the shifting of said element from retaining position relative to the said coacting means.

3. In a pinking machine, a cutter means including a stationary lower cutter and a spring controlled reciprocatory structure carrying an upper cutter for coaction with the lower cutter, means for shifting said structure, against the action of its controlling spring, in one direction for imparting a cutting stroke to said cutter means, a driven means including a revoluble part, a normally inactive revoluble cam structure loosely mounted on said part providing when revolved the shifting of the means for shifting the said reciprocatory structure and a clutching means permanently tending to connect the cam structure to said part to cause the cam structure to bodily revolve with said part, a shiftable controlling means for said clutching means to normally retain the latter in non-clutching relation with respect to said part and cam structure, spring controlled means for shifting said controlling means from its retaining position relative to said clutching means, and means to prevent the shifting of said controlling means from its retaining position relative to said clutching means when removing completed work and positioning work to be acted upon.

4. In a pinking machine, a cutter structure, means for imparting a cutting stroke to said structure, a structure for operating said means including a driven revoluble part, a revoluble part loosely mounted on said other part and a clutching means permanently tending to connect said parts together to provide for the revolving thereof in unison, a shiftable controlling means normally impacted by and tending to retain said clutching means in non-clutching position, spring controlled means for shifting said controlling means temporarily from and to its retaining position to permit respectively of the clutching means connecting said parts together whereby said parts will revolve in unison and to be impacted by said clutching means on a completion of the revolution of said parts to unclutch said parts, and means for arresting the shifting of said controlling means from retaining position relative to said clutching means on the removal of completed work and the positioning of work to be acted upon.

5. In a pinking machine, a cutter means including a horizontally disposed lower cutter having a straight cutting edge formed with serrations and a vertically movable spring controlled reciprocatory structure arranged above and depending below the lower cutter and having an upper cutter disposed throughout at an inclination to the horizontal and provided with an inclined cutting edge formed with serrations disposed in lateral offset relation with respect to the serrations of the lower cutter.

6. In a pinking machine, a cutter means including a horizontally disposed lower cutter having a straight cutting edge formed with serrations and a vertically movable spring controlled reciprocatory structure arranged above and depending below the lower cutter and having an upper cutter disposed throughout at an inclination to the horizontal and provided with an inclined cutting edge formed with serrations disposed in lateral offset relation with respect to the serrations of the lower cutter, and shiftable controlling means slidably engaging the lower portion of said structure for lowering the latter in a direction to impart a cutting stroke to said cutter means.

7. In a pinking machine, a cutter means including a horizontally disposed lower cutter having a straight cutting edge formed with serrations and a vertically movable spring controlled reciprocatory structure arranged above and depending below the lower cutter and having an upper cutter disposed throughout at an inclination to the horizontal and provided with an inclined cutting edge formed with serrations disposed in lateral offset relation with respect to the serrations of the lower cutter, shiftable controlling means slidably engaging the lower portion of said structure for lowering the latter in a direction to impart a cutting stroke to said cutter means, and a controllable revoluble cam structure arranged over and for engaging, during a revolution thereof the said shiftable controlling means for shifting the latter in a direction to lower said spring controlled vertically movable structure.

8. In a pinking machine, a cutter means including a horizontally disposed lower cutter having a straight cutting edge formed with serrations and a vertically movable spring controlled reciprocatory structure having a horizontally disposed upper cutter provided with an inclined cutting edge formed with serrations disposed in lateral offset relation with respect to the serrations of the lower cutter, shiftable controlling means slidably bearing on the lower portion of said structure for lowering the latter in a direction to impart a cutting stroke to said cutter means, a controllable revoluble cam structure for engaging during a revolution thereof the said shiftable controlling means for shifting the latter in a direction to lower said spring controlled vertically movable structure, and means for preventing the revolving of the cam structure when removing completed work and positioning work to be operated upon.

9. In a pinking machine, a cutter means including a horizontally disposed lower cutter having a straight cutting edge formed with serrations and a vertically movable spring controlled reciprocatory structure having a horizontally disposed upper cutter provided with an inclined cutting edge formed with serrations disposed in lateral offset relation with respect to the serrations of the lower cutter, shiftable controlling means slidably bearing on the lower portion of said structure for lowering the latter in a direction to impart a cutting stroke to said cutter means, a controllable revoluble cam structure for engaging during a revolution thereof the said shiftable controlling means for shifting the latter in a direction to lower said spring controlled vertically movable structure, and a normally lowered spring controlled guard structure arranged forwardly of said cutter means for normally holding down the work to be operated upon and including means acting when said guard structure is elevated to prevent the operation of said cam structure.

10. In a pinking machine, a cutter means, a driven operating structure for said cutter means including a pivoted shiftable lever bearing on said cutter means, a normally non-revoluble part for shifting said lever when said part is revolved and controlled clutching means when active causing said part to be revolved, a shiftable controlling means for making said clutching means active and inactive relative to said part, and means to prevent the revolving of said part when removing completed work and poistioning work to be acted upon.

11. In a pinking machine, notching cutter means including a stationary lower cutter and a vertically disposed reciprocatory structure arranged over and depending below said lower cutter and being formed at its upper portion with an upper cutter, said structure being provided centrally of its lower end with a pivoted block, an oscillatory lever arranged below said lower cutter and having one end overlapping and slidably engaging said block, and a clutchable driven means arranged over and having a part wiping said lever intermediate the ends of the latter for shifting the lever in a direction for imparting a cutting stroke to said cutter means and a vertically movable normally lowered combined guard, presser foot and stop mechanism providing when lowered for holding down the work to be operated upon over the lower cutter and in the path of the upper cutter and when elevated to release the work and to arrest the action of the clutchable driven means.

12. In a pinking machine, a cutter means including a stationary lower cutter and a reciprocatory upper cutter, a normally inactive shiftable lever arranged below said lower cutter and coacting when shifted with said structure for imparting a cutting stroke to the means, a revoluble normally inactive cam structure providing when active for shifting said lever, a drive mechanism upon which the cam structure is loosely mounted, said cam structure and mechanism having controllable coacting means for clutching the cam structure and mechanism together to provide for the revolving of the cam structure with said mechanism, a shiftable element for controlling and normally acting to retain said connecting means from clutching said cam structure and mechanism together, means for shifting said element from retaining position relative to said coacting means whereby the latter will clutch the cam structure and mechanism together, and a vertically movable normally lowered combined guard, presser foot and stop mechanism providing when lowered for holding down the work to be operated upon over the lower cutter and in the path of the upper cutter and when elevated to release the work and to arrest the shifting of said element from retaining position relative to the said coacting means.

STEPHEN NASO.
FRANK GOODSTEIN.